Figure 1:
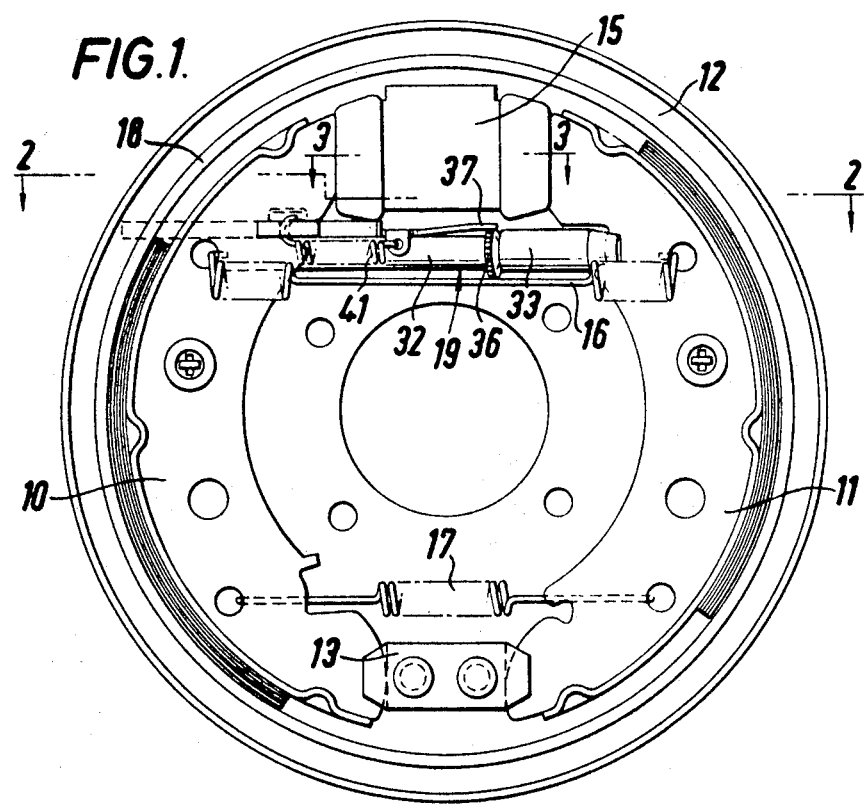

United States Patent

[11] 3,583,532

| [72] | Inventor | Harold Hodkinson<br>Leamington Spa, England |
| --- | --- | --- |
| [21] | Appl. No. | 791,232 |
| [22] | Filed | Jan. 15, 1969 |
| [45] | Patented | June 8, 1971 |
| [73] | Assignee | Automotive Products Company Limited<br>Leamington Spa, England |
| [32] | Priority | Jan. 15, 1968 |
| [33] | | Great Britain |
| [31] | | 2204/68 |

[54] AUTOMATIC ADJUSTING MEANS FOR INTERNAL SHOE DRUM BRAKES
3 Claims, 3 Drawing Figs.

[52] U.S. Cl. .................................................. 188/79.5,
188/106, 188/196
[51] Int. Cl. .................................................. F16d 65/56
[50] Field of Search .......................................... 188/79.5
(GE,GL,P), 106 (A,F), 196 (RR)

[56] References Cited
UNITED STATES PATENTS

| 3,216,534 | 11/1965 | Chouings et al. | 188/79.5(GE) |
| 3,323,618 | 6/1967 | Riddy | 188/106(F)X |

*Primary Examiner*—Duane A. Reger
*Attorney*—Lawrence J. Winter

ABSTRACT: In an internal shoe drum brake having both fluid pressure and mechanical shoe-expanding means the mechanical shoe-expanding means constitute an adjustable shoe-spacing assembly holding the shoes against inward movement by pulloff springs, the actuation of the mechanical expanding means to expand the shoes effecting an idle movement of one-way driving means which are moved in the driving direction by a spring, when the shoes are expanded by the fluid pressure means, to act on length-increasing means embodied in the spacing assembly and increase the shoe spacing.

PATENTED JUN 8 1971

3,583,532

INVENTOR
Harold Hodkinson
BY Lawrence J. Winter
ATTORNEY

AUTOMATIC ADJUSTING MEANS FOR INTERNAL SHOE DRUM BRAKES

This invention relates to automatic adjusting means for internal shoe drum brakes of the kind in which both fluid pressure means and mechanical means are provided for expanding the shoes into engagement with the drum.

Many proposals have been made for the automatic adjustment of such brakes, some forms of adjuster being actuated as a result of operation of the brakes by the fluid pressure means and others as a result of operation of the brakes by the mechanical means. It is the object of the present invention to provide an improved automatic-adjusting means for brakes of the kind referred to.

According to the present invention, in automatic-adjusting means for an internal shoe drum brake in which both fluid pressure means and mechanical means are provided for expanding the shoes into engagement with the drum, the mechanical shoe-expanding means constitute an adjustable shoe spacing assembly supporting the shoes against inward movement by pulloff springs and one-way driving means, acting on length increasing means embodied in the said spacing assembly, are moved in the nondriving direction by actuation of the mechanical shoe expanding means to expand the shoes and are moved in the driving direction by a spring when the shoes are expanded by the fluid pressure means and the spacing assembly is thereby relieved of the load exerted on the shoes by the pulloff springs.

Preferably, the mechanical shoe-expanding means comprises a strut engaging at one end with one shoe, a lever pivoted on the strut and engaging the other shoe, stop means to limit angular movement of the lever in one direction relative to the strut to limit inward movement of the shoes relative to each other under the load of the pulloff spring means, and means controlled by angular movement of the lever relative to the strut to increase the length of the strut the said means including a ratchet wheel the rotation of which actuates means to vary the length of the strut, a pawl movable idly relative to the ratchet wheel by movement of the lever relative to the strut, and a spring, loaded by such movement of the pawl, acting on the pawl in a direction to move the ratchet wheel and means actuated thereby to increase the length of the strut.

The means to vary the length of the strut conveniently comprises a screw device.

Figure 2:
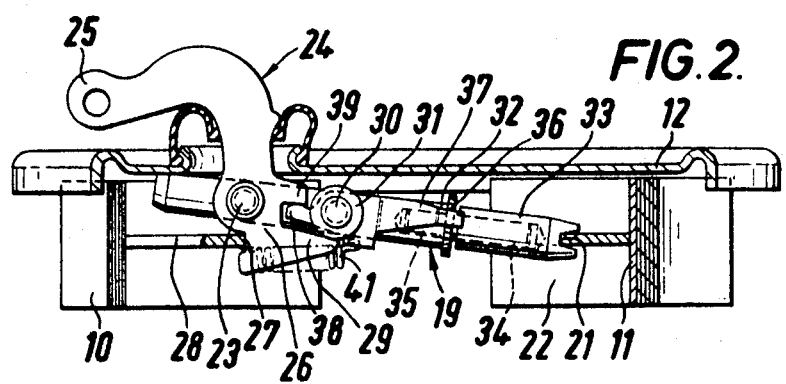
Figure 3:
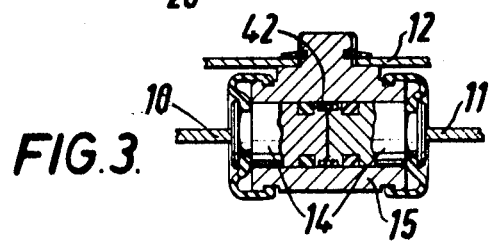

One form of internal shoe drum brake embodying the invention will now be described, by way of example, with reference to the accompanying drawings, in which:

FIG. 1 is a front elevation of the brake;
FIG. 2 is a section on the line 2-2 of FIG. 1; and
FIG. 3 is a section on the line 3-3 of FIG. 1.

Referring to the drawings, a pair of brake shoes 10, 11 are mounted on a backplate 12 or equivalent support, one pair of adjacent ends of the said shoes engaging a common anchorage abutment 13 mounted on the backplate 12 and their other pair of adjacent ends engaging pistons 14 (FIG. 3) of a double-acting liquid pressure wheel cylinder 15 also mounted on the backplate. Pulloff springs 16 and 17 each extending from one shoe to the other retract the shoes 10, 11 away from the surface of a surrounding drum 18.

A strut member 19 of adjustable length having one end engaging at 21 with the web 22 of the brakeshoe 11 adjacent to the end thereof which is engaged by a wheel cylinder piston, and extending generally parallel to the axis of the wheel cylinder 15 has pivotally mounted on it at 23 adjacent its other end a two-armed lever 24 one arm 25 of which extends through an opening in the backplate 12 and is coupled to a mechanical brake-applying linkage (not shown). The other arm 26 of the lever engages at 27 with the web 28 of the brakeshoe 10, and has a laterally offset portion 29 adapted to engage a stop 31 on the strut member 19 to limit angular movement of the lever relative to the strut in one direction. Thus the strut and lever combination 19,24 serves as a spacing assembly limiting relative inward movement of the shoes 10,11 under the action of the pulloff springs 16,17.

The strut member 19, as shown in the drawing, comprises two strut components 32, 33 arranged end to end, a stem 34 fixed in the component 33 and having a screw-threaded portion 35 extending into a plain hole in the component 32, having mounted in the said screw-threaded portion a disclike nut 36, the component 32 abutting against the nut 36 so that rotation of the nut varies the length of the strut. The screw-threaded stem 34 and 36 thus constitute length-increasing means. Ratchet teeth formed in the periphery of the nut 36 are so oriented that a pawl cooperating with them rotates the nut in a direction to increase the length of the strut, the nut 36 thus constituting a ratchet wheel.

A one-way drive to the length-increasing means is provided by a pawl 37 pivotally mounted on the strut component 32 by means of a pivot pin 30 and cooperating with the ratchet wheel constituted by the nut 36, the pawl having a tail 38 cooperating with a lateral projection 39 on the lever 24 in such a way that movement of the said lever relative to the strut member 19 to urge the brakeshoes apart rocks the pawl 37 relative to the ratchet wheel in a direction such that the said pawl tends to ride idly over the ratchet teeth. A spring 41 is provided to urge the pawl in the opposite direction. The pivot pin 30 carries a washer serving as the stop 31 for the lever 24.

Thus, when the brake is applied by moving the lever 24 to expand the shoes 10,11 the pawl 37 tends to ride over the ratchet teeth, and, if, due to wear of the brakeshoe linings, the movement of the pawl is sufficient to carry it over the tip of a tooth, it drops into the next notch. When the brake is released, the strut member 19 is maintained under axial load due to the action of the pulloff springs 16,17, and the resulting frictional load on the screw threads of the stem 34 and nut 36 prevents the ratchet wheel from turning. The next time the shoes are expanded by liquid pressure acting in the wheel cylinder 15, however, the axial load on the strut 19 is relieved, and the pawl 37 is moved by its loading spring 41 to rotate the ratchet wheel and thus increase the length of the strut, so that the shoes return to a new position providing less clearance.

The screw device for altering the length of the strut member 19 may have length varying means different from those shown in FIG. 2. For example, the ratchet wheel may be fixedly mounted on a right- and left-hand screw-threaded rod engaging in screw threaded bores in both components of the strut member.

As shown in FIG. 3 of the drawings, a spring 42 may be mounted between the pistons 14 in the wheel cylinder 15, so that the said pistons will remain at all times in engagement with the brakeshoes.

I claim:

1. Automatic brake-adjusting means for a brake comprising a pair of spaced brakeshoe members, a fluid pressure brake-expanding means, a separate and independent mechanical brake-expanding means comprising a strut engaged at one end with one brakeshoe member, a lever pivoted on the strut and engaging the other brakeshoe member, length-adjusting means including a ratchet wheel on said strut to increase the overall length of said strut, pawl means on said lever to engage said ratchet wheel to rotate it and lengthen said strut, said wheel being movable idly by said pawl means upon a first brake application by said fluid pressure brake-expanding means and by a first application of said mechanical brake-expanding means and by a first application of said mechanical brake-expanding means, and a spring operatively connected to said pawl means and a brakeshoe member to rotate said ratchet wheel in a drive direction opposite to said idle movement direction when said fluid pressure brake-expanding means is again applied.

2. Automatic-adjusting means for an internal shoe drum brake in which both fluid pressure means and mechanical means are provided for expanding the shoes into engagement with the drum, wherein the mechanical shoe-expanding means constitute an adjustable shoe spacing assembly supporting the shoes against inward movement by pulloff springs, and one-way driving means, acting on length-increasing means embodied in the said spacing assembly which are moved in the nondriving direction by actuation of the mechanical shoe-expanding means to expand the shoes and are moved in the driving direction by a spring when the shoes are expanded by the fluid pressure means and the spacing assembly is thereby relieved of the load exerted on the shoes by the pulloff springs, said mechanical shoe-expanding means comprising a strut engaging at one end with one shoe, a lever pivoted on the strut and engaging the other shoe, stop means to limit angular movement of the lever in one direction relative to the strut to limit inward movement of the shoes relative to each other under the load of the pulloff spring means, means controlled by angular movement of the lever relative to the strut to increase the length of the strut, including a ratchet wheel, the rotation of which actuates means to vary the length of the strut, a pawl movable idly relative to the ratchet wheel by movement of the lever relative to the strut and a spring, loaded by such movement of the pawl, acting in the pawl in a direction to move the ratchet wheel and means actuated thereby to increase the length of the strut, said pawl being pivotally mounted on said strut and being provided with a tail portion cooperating with a lateral projection on the lever.

3. Automatic adjusting means of claim 2 wherein said stop means to limit angular movement of the lever comprises a washer mounted on a pivot pin providing the pivotal mounting for said pawl.